Nov. 26, 1935.        J. ASKIN        2,021,881

REFRIGERANT CONTROL DEVICE

Filed July 21, 1934

Inventor
Joseph Askin
By Albert R. Henry
Attorney

Patented Nov. 26, 1935

2,021,881

UNITED STATES PATENT OFFICE 2,021,881

REFRIGERANT CONTROL DEVICE

Joseph Askin, Buffalo, N. Y., assignor to Fedders Manufacturing Company, Inc., Buffalo, N. Y.

Application July 21, 1934, Serial No. 736,397

4 Claims. (Cl. 236—92)

This invention relates to control valves for use in refrigeration systems, and it has particular reference to valves of the thermostatic type.

It has heretofore been recognized in valves of this type that expansion of the refrigerant and the attendant freezing temperatures in the valve itself caused various failures or inaccuracies, chief among which was the contraction of the actuating fluid in the thermostatic element, with the resultant failure to develop sufficient vapor pressure to operate the valve mechanism. To alleviate this condition, it has been proposed to throttle the refrigerant at the outlet of the valve by means of a fixed orifice in order that expansion of the refrigerant be prevented until it has passed the valve. This expedient succeeded in overcoming the thermal problem, but at the expense of seriously impairing the volumetric capacity of the valve.

In the present invention, a thermostatic valve is provided, in which, after the refrigerant has been metered under the control of the thermostatic element, it is retained at a relatively high pressure until it is delivered to the valve outlet. This is accomplished without affecting the volumetric capacity of the valve by providing a restriction of a variable characteristic in the outlet passage, such restriction being responsive in its extent to the opening movement of the metering valve, so that substantially constant and relatively high pressures are maintained in the delivery chamber of the valve at all rates of refrigerant delivery.

A practical embodiment incorporating these principles is more specifically described and shown in the accompanying specification and drawing, wherein.

Figure 1:
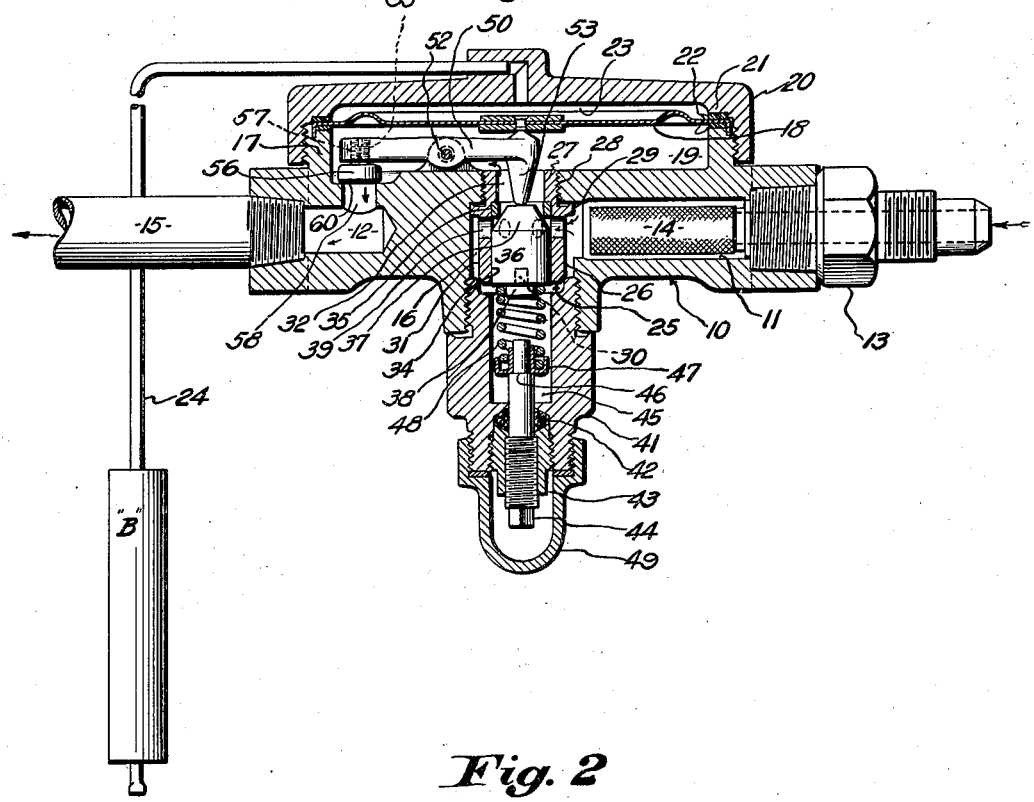
Fig. 1 is a vertical section through the thermostatic valve.
Figure 2:
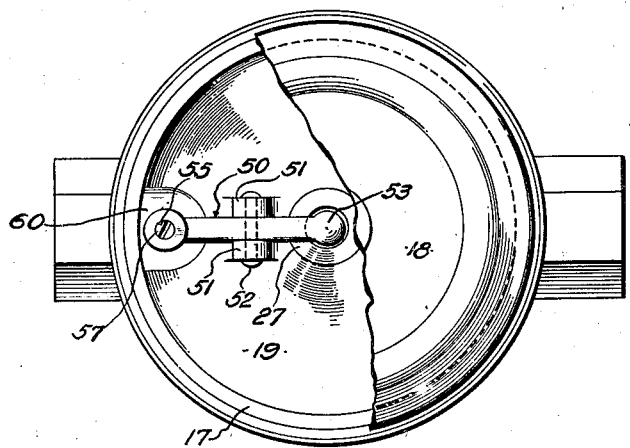
Fig. 2 is a top view thereof with the cover removed and the diaphragm partially broken away to show the underlying valve structure.

As illustrated in the drawing, the thermostatic valve is provided with a cylindrical body 10, which is formed with diametrically opposed inlet and outlet passages 11 and 12 respectively, the former containing a threaded fitting 13 carrying a strainer 14, and the latter receiving an outlet pipe 15. The lower portion of the body is axially drilled to provide a valve chamber 16, while the upper face of the body is formed with an annular flange 17. The face of the flange serves to receive a diaphragm 18, which thus cooperates to form an enclosure or pressure chamber 19 within the confines of the flange.

The diaphragm is secured in position by a cap 20, which is internally threaded to engage the flange 17 and which is also formed with a shoulder 21 for receiving an annular gasket 22, which engages the diaphragm. A second and similar gasket may be interposed between the diaphragm and flange 17. The internal portion of the cap, thus enclosed by the diaphragm, may, if desired, form a portion of a thermostatic element, and it is herein termed an expansion chamber 23 which communicates with an expansion bulb "B" through a connecting tube 24. The elimination of the bulb "B" may be resorted to if it is desired to use the valve as a regulation expansion valve.

A valve unit 25 controls fluid communication between the valve chamber 16 and the pressure chamber 19. The unit includes a guide member 26 formed with a threaded extremity 27 which is screwed into an axially disposed tapped hole 28 connecting said chambers. A bevelled flange 29 on the member 26 engages the end wall of the chamber 16 to prevent leakage through the threads. The adjacent cylindrical portion 31 is reduced in diameter to provide an annular clearance with the wall of the chamber 16, and its extremity is formed with a diametrical slot 30 which may be engaged by a screw driver.

The guide member 26 is axially drilled to provide an opening 32 entering the chamber 19, and a counterbore 34 into which is pressed a valve seat 35. A cylindrical metering valve 36 is slidably mounted within the counterbore 34, and its upper extremity is formed with a frusto-conical head 37 adapted to engage the seat 35, while its remaining extremity is formed with a reduced shoulder 38 forming a spring seat. The member 26 is radially drilled adjacent the seat, as indicated by the numeral 39, to provide communication between the chamber 16 and the valve seat 35.

A flanged nut 41 closes the lower extremity of the passage 16, and it is formed to receive a packing 42 and a gland nut 43. The gland nut 43 in turn is internally tapped to receive an adjusting screw 44, which is engaged by the packing and which protrudes into a spring chamber 45 formed in the nut 41. This extremity of the screw is formed with a shoulder 46 which rotatably receives a spring seat 47.

A spring 48 is disposed between the spring seat 47 and the shoulder 38 of the valve 36, and it will be observed that the tension of the spring on the valve 36 may be adjusted from the exterior of the device by manipulating the screw 44. To insure against leakage in the event of failure of the packing 42, a cap nut 49 is threaded over the end of the nut 41.

A lever 50 is disposed radially in the chamber 19, and its central portion is received between lugs 51 which may be formed as an integral part of the body 10. A pin 52, engaged through the lugs and lever, serves to provide a horizontal pivot for the lever. The inner end of the lever is formed with a head 53 coinciding with the axial line of the body and serving as a coupling between the valve head 37 and the diaphragm, while the remaining extremity of the lever is formed with a vertically disposed tapped hole 55.

A valve 56 of the disc type is formed with a threaded stem 57 which is adjustably received in the tapped hole 55 of the lever. This valve overlies a hole 58 which connects the low pressure chamber 19 to the outlet passage 12. It will be noted that when the valve 36 is in closed position, as shown, the remaining valve 56 is disposed in slightly spaced position from its seat, which is indicated by the numeral 60. This relative positioning of the valves is easily obtained in assembly before the diaphragm is mounted, by first adjusting the stem 57 from above, and finally by locking it to the lever 50 by applying a drop of solder in the tapped hole.

In operation, the valve may be coupled in a refrigeration system in a similar manner to any valve of this general type, that is, the input passage 11 is in communication with the condenser or high pressure side of the system, while the passage 12 is connected to the evaporator or low pressure side of the system. The bulb "B" is secured in intimate thermal contact with the evaporator and the fluid charge which it contains responds to the superheat of the evaporator, resulting in the transmission of vapor pressure to the expansion chamber and the corresponding expansion of the diaphragm. The diaphragm, in pressing down on the lever head 53, unseats the valve 36, and, through the pivotal action of the lever, also opens the valve 56 to a greater degree.

During the above described opening movement, liquid refrigerant is directed into the chamber 19 under high pressure, whence it escapes through the hole 58 to the outlet passage 12. It will be noted that the valve 56 offers a restriction to the escape of liquid refrigerant from the chamber 19 and that the extent of such restriction is proportional to the axial opening movement of the valve 36. As a result, relatively high pressures are maintained, and any substantial expansion of the refrigerant in the chamber 19 is prevented. Inasmuch as the temperature in this chamber is roughly inversely proportional to the pressure therein, it will be understood that relatively high temperatures will be maintained in the chamber 19, to the end that the expansive fluid in the overlying chamber 23 will be protected from rapid cooling in the presence of the refrigerant, and will thus respond without exterior hindrance to the temperature of the evaporator.

It will further be observed that the restriction, due to its control by the diaphragm, varies with the volume of liquid delivered through the valve 36 to the pressure chamber 19, and accordingly maintains a substantially uniform pressure in the chamber 19, regardless of the rate of fluid flow. This result is particularly desirable, as the presence of uniform pressures and uniform temperatures on the lower face of the diaphragm permits an accurate control of the valve 36 directly by the expansive fluid in the bulb "B".

It will be obvious that various modifications may be made in the mechanical linkage between the valves and in the specific type and relative disposal of the valves without departing from the scope of the invention, as set forth in the following claims.

I claim:

1. In a refrigerant valve, a body containing a pressure chamber and inlet and outlet passages entering said chamber, a metering valve in the inlet chamber, a valve for restricting the area of the outlet passage, a thermostatic element having an expansive portion mounted in the chamber, and means operated by the expansive portion for opening both valves.

2. In a refrigerant valve, a body containing a pressure chamber and inlet and outlet passages entering said chamber, a metering valve in the inlet passage, a seat therefor in the inlet passage, resilient means for retaining the valve in seated position, a valve in the outlet passage, a pressure responsive element disposed in the chamber, a mechanism mounted in the chamber and having a portion formed to couple the element and said metering valve, and a second valve mounted on the mechanism and disposed in the outlet passage, said lever being operable by the element to open both valves.

3. In a refrigerant valve, a body containing a pressure chamber and inlet and outlet passages entering said chamber, a metering valve in the inlet passage, a seat therefor in the inlet passage, resilient means for retaining the valve in seated position, a pressure responsive element disposed in the chamber, a lever in the chamber, bearing means in the chamber for mounting the lever for pivotal movement adjacent its central portion, one extremity of the lever being formed to connect the element to the metering valve, and a valve in the outlet passage secured to the remaining extremity of the lever, said lever being operable by the element to open both valves.

4. In a refrigerant valve, a body containing a pressure chamber and inlet and outlet passages entering said chamber, a metering valve in the inlet passage, a seat therefor in the inlet passage, resilient means for retaining the valve in seated position, a pressure responsive element disposed in the chamber, a lever pivotally mounted in the chamber and having one extremity formed to connect the element and valve, and a valve in the outlet passage, said valve being adjustably secured to the remaining extremity of the lever whereby it may be adjusted to a substantially closed position when the metering valve is seated, said lever being operable by the element to open both valves.

JOSEPH ASKIN.